United States Patent
Futamura et al.

Patent Number: 5,264,465
Date of Patent: Nov. 23, 1993

[54] CONTACT LENS MATERIAL AND CONTACT LENS

[75] Inventors: Hideyuki Futamura, Kamisato; Masashi Nomura, Kodama; Yuuichi Yokoyama, Kounosu, all of Japan

[73] Assignee: Hoya Corporation, Tokyo, Japan

[21] Appl. No.: 826,766

[22] Filed: Jan. 28, 1992

[30] Foreign Application Priority Data

Jan. 31, 1991 [JP] Japan .................................. 3-011322

[51] Int. Cl.⁵ .............................................. C08K 5/00
[52] U.S. Cl. ..................................... 523/106; 523/107; 526/246
[58] Field of Search ................. 523/106, 107; 526/246

[56] References Cited

U.S. PATENT DOCUMENTS 5,008,354  4/1991  Sawamoto et al. ................ 526/246

Primary Examiner—Paul R. Michl
Assistant Examiner—LaVonda Dewitt
Attorney, Agent, or Firm—Nixon & Vanderhye

[57] ABSTRACT

A contact lens material which is suitable for producing a contact lens having intermediate and low hydrous nature and which has hardness suitable for machining by cutting and polishing, is formed of a copolymer obtained by copolymerizing a monomer mixture which contains, based on 100 parts by weight of the monomer mixture, 35 to 65 parts by weight of at least one fluorine-containing monomer of the formula (I), $$CH_2=\overset{R_1}{\underset{\|}{C}}-\underset{O}{C}-O-(CHCH_2O)_a-(CH_2)_m-C_nF_pH_q \quad (I)$$
$$\phantom{CH_2=C-C-O-(}R_2$$

wherein $R_1$ is $CH_3$, $R_2$ is H or $CH_3$, a is an integer of 1 to 9, m is an integer of 1 to 5, n is an integer of 4 to 10, p is an integer of 8 or greater, q is an integer of 0 or greater, and p, q and n have the relationship of $p+q=2n+1$, and 30 to 45 parts by weight of at least one amide group-containing monomer as essential components and which also contains other monomer as an optional component. The contact lens is obtained from the above contact lens material.

28 Claims, No Drawings

CONTACT LENS MATERIAL AND CONTACT LENS

FIELD OF THE INVENTION

The present invention relates to a contact lens material and contact lens, and more specifically to a contact lens material suitable for machining such as cutting and polishing, and a hydrous contact lens obtained from the contact lens material.

PRIOR ART OF THE INVENTION

Contact lenses generally used at present are largely classified into hydrous contact lenses and unhydrous contact lenses.

In the hydrous contact lenses, a highly hydrous contact lens generally refers to a hydrous contact lens having a water content of not less than 60%. The defect with the highly hydrous contact lens is that it is deficient in mechanical strength and easily becomes soiled or dirty.

Meanwhile, most of contact lenses having low or intermediate hydrous nature, which are hydrous contact lenses having a water content of less than 60%, show insufficient oxygen permeability.

The present inventors have proposed the invention described in PCT/JP90/00973 (international filing date; Jul. 31, 1990), which discloses the above highly hydrous contact lens and the above hydrous contact lenses having low and intermediate hydrous nature.

The highly hydrous contact lens obtained by the above invention cannot be said to have completely overcome the above problems of conventional highly hydrous contact lenses. Further, all of copolymers from which the contact lens having low and intermediate hydrous nature are obtained have low hardness, and it cannot be said that those copolymers have excellent hardness which permits easy machining such as cutting and polishing.

SUMMARY OF THE INVENTION

The present invention has been made to overcome the above problems. It is an object of the present invention to provide a contact lens material which is suitable for producing a contact lens having low or intermediate hydrous nature and which has sufficient hardness to permit machining such as cutting and polishing, and a contact lens obtained from this material.

According to the present invention, there is provided a contact lens material formed of a copolymer obtained by copolymerizing a monomer mixture which contains, based on 100 parts by weight of the monomer mixture, 35 to 65 parts by weight of at least one fluorine-containing monomer of the formula (I).

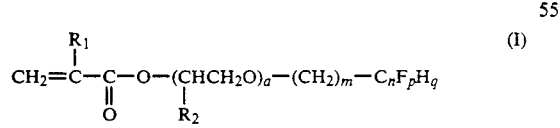

wherein $R_1$ is $CH_3$, $R_2$ is H or $CH_3$, a is an integer of 1 to 9, m is an integer of 1 to 5, n is an integer of 4 to 10, p is an integer of 8 or greater, q is an integer of 0 or greater, and p, q and n have the relationship of $p+q=2n+1$, and 30 to 45 parts by weight of at least one amide group-containing monomer as essential components and which also contains other monomer as an optional component, and there is also provided a hydrous contact lens obtained by machining the above contact lens material.

DETAILED DESCRIPTION OF THE INVENTION

The present invention will be detailed hereinafter.

The amount of each component is important to obtain the contact lens material and the contact lens of the present invention.

The fluorine-containing monomer of the formula (I), a first essential component constituting the copolymer of the present invention, contributes toward imparting the copolymer with oxygen permeability and toward preventing an increase in the water content. The amount thereof for use is 35 to 65 parts by weight. When this amount is less than 35 parts by weight, the resultant contact lens is frequently highly hydrous, and it is therefore liable to be soiled and deficient in mechanical strength. And, even if a contact lens having low or intermediate hydrous nature is produced, no practical oxygen permeability is obtained. When the above amount exceeds 65 parts by weight, the copolymer in a dry state before hydration has too low a hardness to be machined. Further, when the above amount exceeds 65 parts by weight, the resultant copolymer is frequently liable to show a decrease in form recoverability. The amount of the fluorine-containing monomer is preferably 50 to 63 parts by weight.

In the formula (I), the fluorine-containing group of $C_nF_pH_q$ takes part in increasing the oxygen permeability of the contact lens. The subindex, n, is an integer of 4 to 10. When n is an integer of 3 or less, p is consequently an integer of 7 or less, and the oxygen permeability is undesirably insufficient. When n is an integer of 11 or greater, the resultant lens is undesirably fragile. The greater the number of fluorine atoms is, the higher the oxygen permeability is. Therefore, the subindex, p, is properly an integer of 8 or greater. The subindex, q, is an integer of 0 or greater, which means that $C_nF_pH_q$ may be not only a perfluoroalkyl group (q=0) but also a fluoroalkyl group containing H atom(s). Further, $p+q=2n+1$ means that $C_nF_pH_q$ does not contain any unsaturated bond. In addition, the $C_nF_pH_q$ is preferably linear.

In the oxyalkylene group of

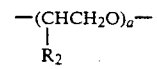

in which $R_2$ is H or $CH_3$, the oxyethylene $-(CH_2CH_2O)_a-$, the oxypropylene of

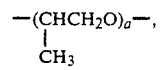

and the oxyethylene-oxypropylene of

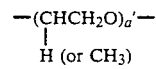

contribute toward imparting hydrophilic nature to the fluorine-containing monomer and the copolymer obtained. Moreover, the above groups also work to improve the compatibility with the amide group-containing monomer which is the other essential component in the present invention. The subindex, a, is properly an integer of 1 to 9. When a is 0, the compatibility with the amide group-containing monomer is poor, and it is difficult to obtain a transparent polymer by general bulk polymerization. When a is an integer of 10 or greater, it is difficult to obtain a pure monomer in the synthesis thereof, since a mixture of monomers each having a different number of the subindex, a, is obtained, and the copolymer obtained by the polymerization is liable to be unstable in physical properties. The subindex, a, is more preferably an integer of 1 to 5. The number of the oxyethylene-oxypropylene, i.e., a', is properly an integer of 2 to 9. When a' is 1, no oxyethylene-propylene group is constituted. When a' is 10 or greater, the resultant copolymer is similarly unstable in physical properties. The subindex, a', is preferably an integer of 2 to 5.

The group of —$(CH_2)_m$— is necessary to avoid the hydrolysis problem of the fluorine-containing monomer and keep it as a stable compound. In order to have the fluorine-containing monomer exhibit stability, the subindex, m, is properly an integer of 1 to 5, and more preferably an integer of 1 or 2.

Specific examples of the fluorine-containing monomers of the formula (I) are as follows.

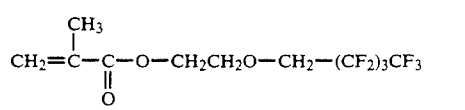

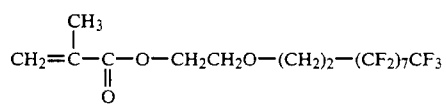

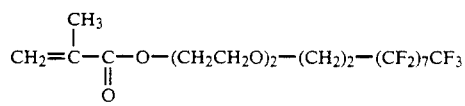

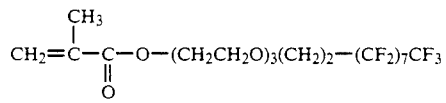

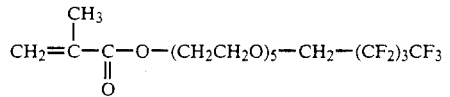

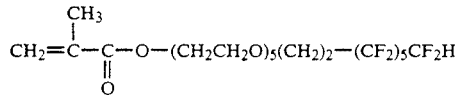

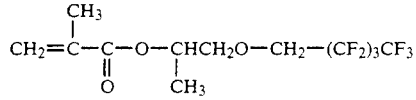

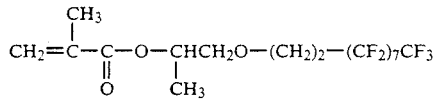

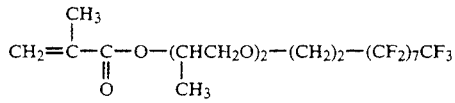

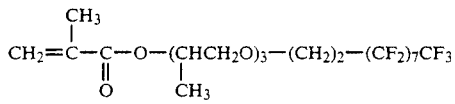

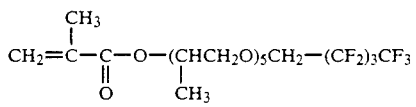

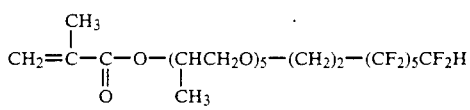

-continued

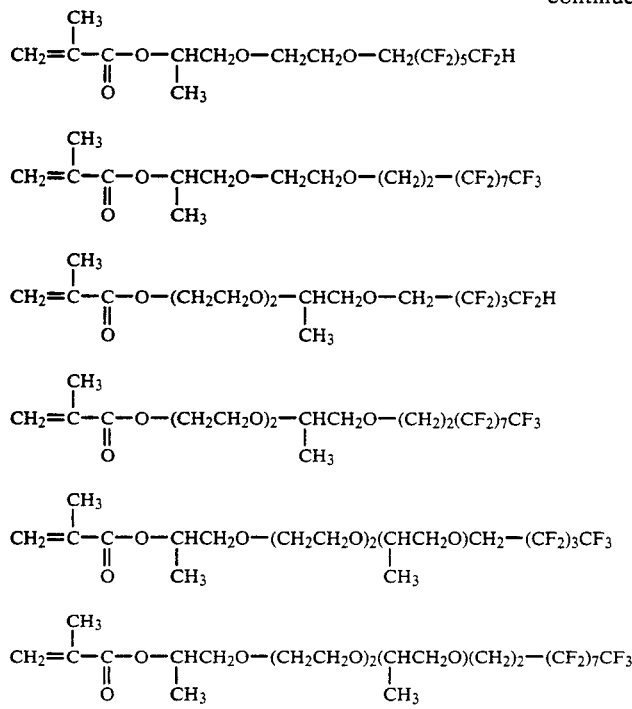

In the above fluorine-containing monomers of the formula (I), $R_1$ is $CH_3$, and the monomers are methacrylates. Therefore, these monomers have excellent machinability over acrylates. Particularly preferred are perfluorooctylethyloxypropylene methacrylate and perfluorooctylethyloxyethylene methacrylate.

The amide group-containing monomer, which is a second essential component to constitute the copolymer obtained in the present invention, imparts hydrous nature to the contact lens material and the contact lens, and contributes toward improving the fitting or wearing sense of the lens. The amide group-containing monomer is used in an amount of 30 to 45 parts by weight. When this amount is less than 30 parts by weight, the resultant copolymer before hydration is deficient in hardness, and it is therefore difficult to machine the contact lens material. Further, due to insufficient capability of containing water, the plasticization in the hydration is insufficient, and as a result, the resultant lens has some hardness or stiffness and gives a poor wearing sense. When the above amount exceeds 45 parts by weight, the water content increases, and the resultant contact lens has a water content of more than 55%. Therefore, the lens shows a decrease in resistance to contamination and is liable to become soiled. Further, due to a decrease in the compatibility of the monomer with the other monomers, the possibility of the lens being opaque increases. The amount of the amide group-containing monomer is preferably 35 to 43 parts by weight.

The amide group-containing monomer include, for example, N,N-dialkyl(meth)acrylamides typified by N,N-dimethyl(meth)acrylamide and monoalkyl(meth)acrylamides. Of these, N,N-dimethylacrylamide (DMAA) is particularly preferred in view of the compatibility with the other monomers such as the fluorine-containing monomer.

When the copolymer is produced by bulk polymerization, the amount, for example, of DMAA is preferably 30 to 45 parts by weight to obtain a transparent and good-quality copolymer.

In the copolymer forming the contact lens material and the contact lens of the present invention, other optional components may be additionally incorporated as required to modify the copolymer so that the contact lens material and the contact lens have further improved physical properties.

For example, for the purpose of improving the contact lens in form retention, a crosslinking monomer may be added. The crosslinking monomer includes, for example, ethylene glycol di(meth)acrylate, diethylene glycol di(meth)acrylate, triethylene glycol di(meth)acrylate, allyl (meth)acrylate, glycerol di(meth)acrylate, trimethylolpropane tri(meth)acrylate, triallylisocyanurate, 1,4-butanediol di(meth)acrylate and divinyl benzene. These monomers may be used alone or in combination.

The amount of the crosslinking monomer based on 100 parts by weight of the total monomer mixture including the crosslinking monomer is preferably 0.01 to 10 parts by weight. When this amount is less than 0.01 parts by weight, no crosslinking effect is obtained. When it exceeds 10 parts by weight, undesirably, the resultant copolymer is fragile.

For the purpose of improving the contact lens in mechanical properties, the monomer mixture may contain alkyl (meth)acrylate, fluorine-containing alkyl (meth)acrylate other than the fluorine-containing monomers of the formula (I), silicone-containing (meth)acrylate, alicyclic or aromatic (meth)acrylate, and the like.

Examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate and tert-butyl (meth)acrylate. These alkyl (meth)acrylates may be used alone or in combination. Further, there may be used alkyl (meth)acrylates having one or more hydroxyl groups such as 2-hydroxyethyl (meth)acrylate, 2-hydroxylpropyl (meth)acrylate and 2,3-dihydroxypropyl (meth)acrylate.

Examples of the silicone-containing (meth)acrylate include γ-(meth)acryloxypropyltris(trimethylsiloxy)silane, pentamethyldisiloxanylmethyl (meth)acrylate, tert-butyltetramethyldisiloxanylethyl (meth)acrylate and triphenyldimethyldisiloxanylmethyl (meth)acrylate. These silicone-containing (meth)acrylates may be used alone or in combination.

The fluorine-containing (meth)acrylate other than the fluorine-containing monomers of the formula (I) include monomers of the following formula (II),

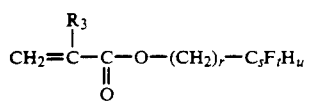

wherein $R_3$ is H or $CH_3$, r is an integer of 1 to 4, s is 1 to 10, t is an integer of 3 or greater, and u is an integer of 0 or greater.

Preferred are monomers of the formula (II) in which s is 3 to 10 and t is an integer of 6 or greater.

Specifically, the monomers of the formula (II) include fluoroalkyl (meth)acrylates typified by hexafluoroisopropyl (meth)acrylate, hexafluorobutyl (meth)acrylate, heptafluoropropyl-methyl (meth)acrylate, nonafluorobutyl-methyl (meth)acrylate, nonafluorobutyl-ethyl (meth)acrylate, tridecafluorohexyl-methyl (meth)acrylate, tridecafluorohexyl-ethyl (meth)acrylate, heptadecafluorooctyl-methyl (meth)acrylate, heptadecafluorooctyl-ethyl (meth)acrylate, and trifluoroethyl (meth)acrylate.

The addition of the fluoroalkyl (meth)acrylate of the above formula (II) can further improve the machinability of the copolymer due to a further increase in the hardness of the copolymer before hydration, or can improve the instantaneous form recoverability of a hydrated and swollen contact lens. It is preferably used in such an amount that the total amount of the above fluoroalkyl (meth)acrylate and the fluorine-containing monomer of the formula (I) is 35 to 70 parts by weight. Since, however, the fluoroalkyl (meth)acrylate of the formula (II) has low compatibility with the above amide group-containing monomer, the amount of the fluoroalkyl (meth)acrylate of the formula (II) is required to be less than the amount of the fluorine-containing monomer of the formula (I).

A contact lens having a water content of more than 55% is sometimes liable to become soiled. When the water content is less than 25%, a hydrated and swollen contact lens, which is obtained from a non-hydrated copolymer having easily machinable hardness, is sometimes deficient in flexibility. Therefore, the water content in the present invention is preferably in the range of from 25 to 55%.

In several known processes for the production of a contact lens, the most practically advantageous process is that which employs cutting and polishing. The hardness suitable for easily producing a contact lens by such a process is generally considered to be a Rockwell hardness ($H_RL$) of not less than 60.

Concerning the oxygen permeability of a contact lens, a contact lens having an oxygen permeability coefficient of not less than $15 \times 10^{-11}$ $cm^3(O_2) \cdot cm/(cm^2 \cdot sec \cdot mmHg)$ can be worn a whole day without any problem. The contact lens of the present invention has an oxygen permeability coefficient of at least $15 \times 10^{-11}$ $cm^3(O_2) \cdot cm/(cm^2 \cdot sec \cdot mmHg)$, and has oxygen permeability which is practically sufficient for wearing it a whole day.

In the production of the contact lens material and the contact lens of the present invention, at first, a comonomer solution is prepared by mixing the above components, and then, a polymerization initiator is added to, and mixed with, the solution. The resultant solution is charged into a metal, glass or plastic polymerization container having a desired form (e.g., a cylindrical container, a test tube, or a container having a lens form), and the container is tightly closed. Thereafter, the above components are heat-polymerized or photo-polymerized, whereby a lens material or a lens-formed article before hydration is obtained. The polymerization initiator is selected from generally used radical generators, which include organic peroxide polymerization initiators typified by benzoyl peroxide, lauroyl peroxide, cumene hydroperoxide, di-tert-butyl peroxide, bis-4-tert-butylcyclohexylperoxydicarbonate, diisopropylperoxydicarbonate and tertbutylperoxy(2-ethylhexanoate); azo polymerization initiators such as 2,2'-azobisisobutyronitrile, 2,2'-azobis(2,4-dimethylvaleronitrile), 2,2'-azobis(4-methoxy-2,4-dimethylvaleronitrile), 2,2'-azobisisobutyrate, 1,1'-azobis(cyclohexane-1-carbonitrile) and 2,2'-(amidinopropane)dihydrochloride; and photopolymerization initiators such as benzoin methyl ether and benzoin ethyl ether. The above polymerization initiators are used alone or in combination. The amount of the polymerization initiator for use per 100 parts by weight of the total monomer mixture is preferably 0.01 to 3.0 parts by weight. When the heat polymerization is carried out, the tightly closed container is placed in a stirrable water bath or a hot air-circulating dryer which can both be temperature-controlled, and the temperature is gradually increased from room temperature. When the photopolymerization is carried out, a polymerization container having high transparency is used, and the monomer mixture is irradiated with ultraviolet light or visible light. In this case, a further favorable result can be obtained by carrying out the polymerization under heat and an inert gas current. In both the heat polymerization and photo-polymerization, the resultant polymer may be heat-treated at 80° to 120° C. while it is in the polymerization container or after it has been taken out of the polymerization container so that a polymerization stress is removed.

After the polymerization and the optional heat treatment, the polymer is cooled to room temperature, machined by cutting and polishing it to an intended lens form, and hydrated and swollen, whereby a hydrous contact lens is obtained.

When a polymer having a lens form is directly obtained, a hydrous contact lens can be obtained by hydrating and swelling the polymer after the polymerization and heat treatment.

EXAMPLES

The present invention will be described further in detail hereinafter by reference to Examples. However, the present invention shall not be limited to these Examples. In addition, physical properties in Examples and Comparative Examples were evaluated as follows.

(A) Hardness ($H_RL$)

A flat plate having a diameter of 15 mm and a thickness of 6 mm was measured with a Rockwell type penetrometer supplied by K.K. Akashi Seisakusho at an L scale (to be abbreviated as "$H_RL$" hereinafter).

(B) Transparency of gel (light transmittance)

To evaluate the transparency of a gel, a test piece having a thickness of 0.2 mm was hydrated and saturated with a 0.9% physiological saline solution by immersing it in the saline solution, and measured for a light transmittance with an auto-recording spectrophotometer U-3210 supplied by Hitachi Ltd. A test piece having a light transmittance of 90% or more was taken as a transparent article and expressed as "O", and a test piece having a light transmittance of less than 90% or being opaque was expressed as "X".

(C) Water content (% by weight) = $[(W_1 - W_2)/W_1] \times 100$ $W_1$ = weight when a polymer was hydrated and saturated.

$W_2$ = weight when the polymer was dehydrated.

(D) Form retention, form recoverability

A flat plate having a central thickness of 0.15 mm and being in a hydrous state was folded in two with fingers, and its form recoverability was evaluated.

O: Excellent (having form recoverability equivalent to that of a hydroxyethyl methacrylate polymer saturated with physiological saline solution).

X: A fold remained, and the original form was not recovered.

XX: Cracked due to stiffness and fragility.

(E) Resistance to contamination

Oleic acid was selected as an artificial, lipid contaminant, and a flat plate in a hydrous state was dipped in the oleic acid with stirring and washed with water. The resistance to the lipid contaminant was visually evaluated by observing the presence or absence of oleic acid remaining on the flat plate surface.

O: Easily removable by washing with water.

X: Adhering too tightly to remove.

EXAMPLE 1

60 Parts by weight of perfluorooctylethyloxypropylene methacrylate (to be abbreviated as "OPMA1" hereinafter), 39.5 parts by weight of N,N-dimethylacrylamide (to be abbreviated as "DMAA" hereinafter), 0.5 part by weight of ethylene glycol dimethacrylate (to be abbreviated as "EDMA" hereinafter), and 0.2 part by weight, per 100 parts by weight of the total comonomer mixture, of 2,2'-azobis-(2,4-dimethylvaleronitrile (to be abbreviated as "V-65" hereinafter) as a polymerization initiator were mixed and mutually dissolved. The resultant solution mixture was cast into a mold, and the mold was tightly closed. The mold was kept in a hot air-circulating dryer at 40° C. for 25 hours, and then the temperature was increased up to 45° C. over 15 hours, from 45° C. to 60° C. over 10 hours, from 60° C. to 80° C. over 8 hours, and from 80° C. to 100° C. over 4 hours. And, the mold was kept at 100° C. for 8 hours to complete the polymerization. Thereafter, the mold was cooled to room temperature, and the resultant copolymer was taken out of the mold. The copolymer was a colorless, transparent and rigid material having a Rockwell hardness ($H_RL$) of 76.

The above-obtained material was cut and polished to a contact lens form by a conventional machining technique, thereby to prepare a contact lens. Then, the contact lens was hydrated and swollen by heating it in a 0.9% physiological saline solution at 80° C. for 6 hours.

As shown in Table 1, the above-obtained hydrous contact lens was a colorless and transparent article having a water content of 41% and being excellent in form retention-instantaneous form recoverability and contamination resistance, and the hydrous contact lens also satisfied all of the following conditions (a) to (g):

(a) To be transparent in both a dry state and a hydrous state.

(b) To have practical oxygen permeability.

(c) To be soft and have form retention when formed into a lens and instantaneous form recoverability after deformed.

(d) To be hardly contaminated with tear components such as proteins and lipids.

(e) To be capable of maintaining wettability on a lens surface for a long period of time when worn.

(f) To have practical mechanical strength.

(g) A copolymer is to have hardness which permits easy production of a contact lens by cutting and surface-polishing.

EXAMPLES 2-12

Contact lens materials were prepared in the same manner as in Example 1 except that some components and the amounts of some components were changed in the ranges specified in the present invention as shown in Tables 1 and 2, and the contact lens materials were cut and polished to produce contact lenses. Tables 1 and 2 show the results of tests of the physical properties of the contact lens materials and the contact lenses. All the copolymers before hydration, obtained in these Examples, were colorless and transparent, rigid materials, and the hydrous contact lenses obtained after the cutting and polishing were satisfied all of the above conditions (a) to (g).

COMPARATIVE EXAMPLE 1

75 Parts by weight of OPMA1, 24.5 parts by weight of DMAA, 0.5 part by weight of triethylene glycol dimethacrylate (to be abbreviated as "3G" hereinafter), and 0.2 part by weight, per 100 parts by weight of the total comonomer mixture, of V-65 as a polymerization initiator were mixed and mutually dissolved to form a mixed solution. The mixed solution was treated in the same manner as in Example 1 to give a copolymer. The copolymer had a Rockwell hardness ($H_RL$) of $-30$, and was significantly soft as compared with the copolymers of the present invention. It was attempted to make a contact lens from the above-obtained copolymer by cutting and polishing it. However, the lens edge was defective, a crack occurred due to polishing, and further, the curvature on the cut surface was easily destroyed due to a polishing pressure. As a result, no optical surface was formed, and no function of a contact lens was imparted. Table 3 shows the other physical properties.

COMPARATIVE EXAMPLE 2

A compolymer was obtained in the same manner as in Example 1 except that the OPMA1 was replaced with perfluorooctylethyl methacrylate (to be abbreviated as "17FMA" hereinafter). Table 3 shows the physical properties of the copolymer. The copolymer was opaque in both a dry state and a hydrous state.

COMPARATIVE EXAMPLES 3 and 4

Copolymers were prepared in the same manner as in Example 1 except that the OPMA1 was replaced with a silicone-containing methacrylate, i.e., γ-methacryloxypropyltris(trimethylsiloxy)silane as a component for high oxygen permeability and that some other components and the amounts of some other components were changed as shown in Table 3. The copolymers were machined to a lens form in the same manner as in Example 1, and saturated and hydrated. Table 3 shows the physical properties of the resultant copolymers. Lipid adhered to both the copolymers, and it was difficult to easily remove the adhering oleic acid by washing with surfactant-containing water. In particular, when the contact lens article in a hydrous state, formed of the copolymer obtained in Comparative Example 4, was worn, the lens became opaque just after worn, and was evaluated to withstand no practical use. Further, the contact lens articles formed of the copolymers obtained in these Comparative Examples did not have flexibility and instantaneous form recoverability at the same time.

COMPARATIVE EXAMPLES 5-8

Components shown in Table 3 were used, and contact lenses were prepared in the same manner as in Example 1. In Comparative Example 5, the contact lens was highly hydrous, or had a water content of 72%, and it was inferior in contamination resistance. In Comparative Examples 6 and 8, the copolymers were opaque and inferior in form retention-recoverability. In Comparative Example 7, the copolymer had low hardness ($H_RL$).

17FMA: perfluorooctylethyl methacrylate
n-BMA: n-butyl methacrylate
TSiMA: γ-methacryloxypropyltris(trimethylsiloxy)silane
HEMA: 2-hydroxyethyl methacrylate
MAA: methacrylic acid
6FMA: hexafluoroisopropyl methacrylate
EDMA: Ethylene glycol dimethacrylate
Allyl MA: allyl methacrylate
TMPT: trimethylolpropane trimethacrylate
3G: triethylene glycol dimethacrylate.

TABLE 1

| | Example | | | | | | |
|---|---|---|---|---|---|---|---|
| | 1 | 2 | 3 | 4 | 5 | 6 | 7 |
| FLUORINE-CONTAINING MONOMER OF FORMULA (I) | | | | | | | |
| OPMA1 | 60 | 57 | 63 | 50 | 40 | | 50 |
| OEMA1 | | | | | | 60 | |
| AMIDE GROUP-CONTAINING MONOMER | 39.5 | 42.8 | 36.5 | 39.5 | 39.5 | 39.8 | 39.8 |
| DMAA | | | | | | | |
| OTHER MONOMERS | | | | | | | |
| 17FMA | | | | | 20 | | |
| TSiMA | | | | | | | |
| HEMA | | | | 10 | | | |
| n-BMA | | | | | | | |
| 6FMA | | | | | | | 10 |
| CROSSLINKING AGENTS | | | | | | | |
| EDMA | 0.5 | 0.2 | | 0.5 | | 0.2 | 0.2 |
| Allyl MA | | | 0.5 | | | | |
| TMPT | | | | | 0.5 | | |
| 3G | | | | | | | |
| (A) $H_RL$ | 76 | 77 | 74 | 87 | 73 | 75 | 87 |
| (B) Gel transparency | ○ | ○ | ○ | ○ | ○ | ○ | ○ |
| (C) Water content (%) | 41 | 45 | 39 | 47 | 43 | 42 | 46 |
| (D) Form retention-recoverability | ○ | ○ | ○ | ○ | ○ | ○ | ○ |
| (E) Contamination resistance | ○ | ○ | ○ | ○ | ○ | ○ | ○ |

The abbreviations in the above Table 1 and the following Tables 2 and 3 are as follows.
OPMA1: perfluorooctylethyloxypropylene methacrylate
OPMA2: perfluorooctylethyldioxypropylene methacrylate
OEMA1: perfluorooctylethyloxyethylene methacrylate
OEMA2: perfluorooctylethyldioxyethylene methacrylate
DMAA: N,N-dimethylacrylamide

TABLE 2

| | Example | | | | |
|---|---|---|---|---|---|
| | 8 | 9 | 10 | 11 | 12 |
| FLUORINE-CONTAINING MONOMER OF FORMULA (I) | | | | | |
| OPMA1 | | | | 60 | 37 |
| OPMA2 | 62 | | | | |
| OEMA1 | | | 50 | | |
| AEMA2 | | 58 | | | |
| AMIDE GROUP-CONTAINING MONOMER | 37.8 | 41.5 | 39.5 | 40 | 39.5 |
| DMAA | | | | | |
| OTHER MONOMERS | | | | | |
| 17FMA | | | | | 23 |
| TSiMA | | | | | |
| HEMA | | | | | |
| n-BMA | | | 10 | | |
| 6FMA | | | | | |
| CROSSLINKING AGENTS | | | | | |
| EDMA | 0.2 | | | | |
| Allyl MA | | | | | 0.5 |
| TMPT | | 0.5 | | | |
| 3G | | | 0.5 | | |
| (A) $H_RL$ | 71 | 74 | 78 | 71 | 75 |
| (B) Gel transparency | ○ | ○ | ○ | ○ | ○ |
| (C) Water content (%) | 40 | 42 | 41 | 43 | 40 |
| (D) Form retention-recoverability | ○ | ○ | ○ | ○ | ○ |
| (E) Contamination resistance | ○ | ○ | ○ | ○ | ○ |

TABLE 3

| | Comparative Example | | | | | | | |
|---|---|---|---|---|---|---|---|---|
| | 1 | 2 | 3 | 4 | 5 | 6 | 7 | 8 |
| FLUORINE-CONTAINING MONOMER OF FORMULA (I) | | | | | | | | |
| OPMA1 | 75 | | | | 25 | 30 | 70 | 65 |
| OEMA1 | | | | | | | | |
| AMIDE GROUP-CONTAINING MONOMER | | | | | | | | |
| DMAA | 24.5 | 39.5 | 14 | 45 | 74.5 | 30 | 29.8 | 25 |
| OTHER MONOMER | | | | | | | | |
| 17FMA | | 60 | | | | | 39.8 | |
| TSiMA | | | 66 | 35 | | | | |
| HEMA | | | | | | | | |
| MAA | | | 6 | | | | | |
| 6FMA | | | | 19.8 | | | | 9.8 |
| CROSSLINKING AGENTS | | | | | | | | |
| EDMA | | 0.5 | | 0.2 | | | | 0.2 |
| Allyl MA | | | | | | 0.2 | | |
| TMPT | | | 14 | | | | | |
| 3G | 0.5 | | | | 0.5 | | 0.2 | |
| (A) $H_RL$ | −30 | — | 61 | 77 | 105 | 40 | 40 | −20 |
| (B) Gel transparency | ○ | X | ○ | ○ | ○ | X | ○ | X |
| (C) Water content (%) | 22 | 44 | 4 | 40 | 72 | 31 | 30 | 25 |
| (D) Form retention-recoverability | ○ | X | XX | X | ○ | X | ○ | X |
| (E) Contamination resistance | ○ | ○ | X | X | X | ○ | ○ | ○ |

According to the present invention, there can be obtained a contact lens material which is suitable for producing a contact lens having low and intermediate hydrous nature and which has hardness suitable for easily carrying out the machining such as cutting and polishing.

The contact lens of the present invention is practically well-balanced among various physical properties and can be produced from a contact lens material which is greatly advantageous in view of a production process. Therefore, the contact lens of the present invention is greatly practically significant.

What is claimed is:

1. A contact lens material formed of a copolymer obtained by copolymerizing a monomer mixture which contains, based on 100 parts by weight of the monomer mixture, 35 to 65 parts by weight of at least one fluorine-containing monomer of the formula (I),

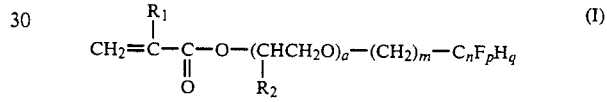

wherein $R_1$ is $CH_3$, $R_2$ is H or $CH_3$, a is an integer of 1 to 9, m is an integer of 1 to 5, n is an integer of 4 to 10, p is an integer of 8 or greater, q is an integer of 0 or greater, and p, q and n have the relationship of $p+q=2n+1$, and 35 to 45 parts by weight of at least one amide group-containing monomer as essential components and which also contains another monomer as an optional component.

2. A contact lens material according to claim 1, wherein the monomer mixture contains 50 to 63 parts by weight of the fluorine-containing monomer (I).

3. A contact lens material according to claim 1, wherein the fluorine-containing monomer (I) is at least one of the fluorine-containing monomers of the following formulae,

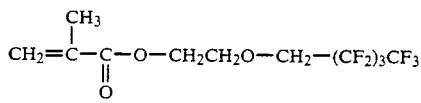

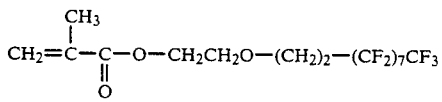

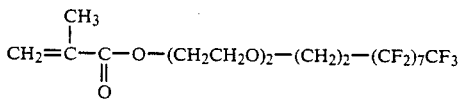

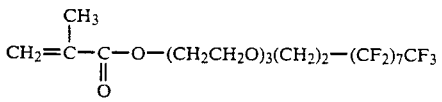

-continued

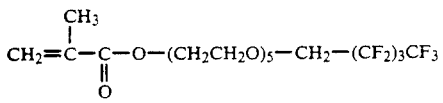

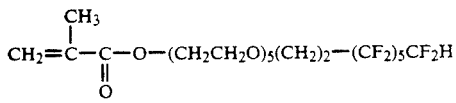

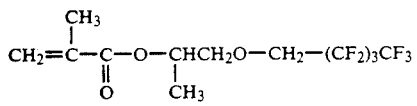

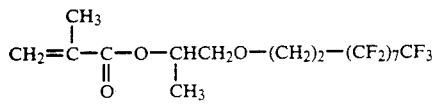

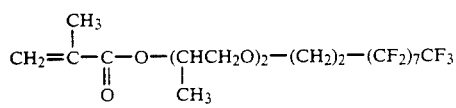

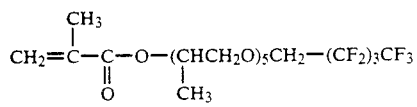

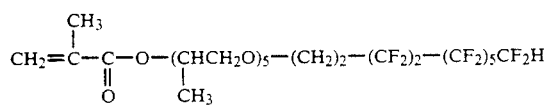

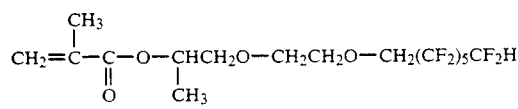

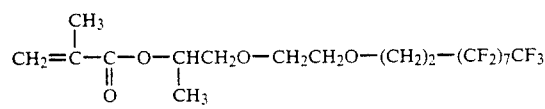

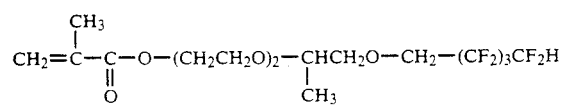

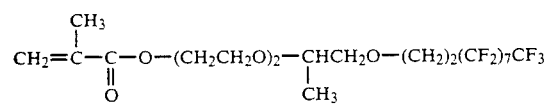

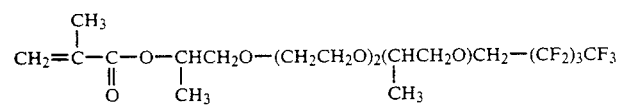

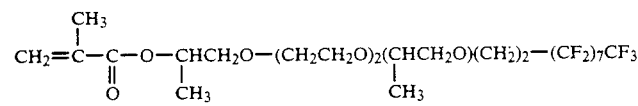

4. A contact lens material according to claim 1, wherein the monomer mixture contains 35 to 43 parts by weight of the amide group-containing monomer.

5. A contact lens material according to claim 1, wherein the amide group-containing monomer is N,N-dialkyl(meth)acrylamide or monoalkyl(meth)acrylamide.

6. A contact lens material according to claim 1, wherein the other monomer as an optional component is a crosslinking monomer.

7. A contact lens material according to claim 6, wherein the crosslinking monomer is at least one member selected from the group consisting of ethylene glycol di(meth)acrylate, diethylene glycol di(meth)acrylate, triethylene glycol di(meth)acrylate, allyl (meth)acrylate, glycerol di(meth)acrylate, trimethylolpropane tri(meth)acrylate, triallylisocyanurate, 1,4-butanediol di(meth)acrylate and divinyl benzene.

8. A contact lens material according to claim 6, wherein the crosslinking monomer is used in an amount of 0.01 to 10 parts by weight based on 100 parts by weight of the total monomer mixture including the crosslinking monomer.

9. A contact lens material according to claim 1, wherein the other monomer as an optional component is at least one member selected from the group consisting of alkyl (meth)acrylate, fluorine-containing alkyl (meth)acrylate other than the fluorine-containing monomer of the formula (I), silicone-containing (meth)acrylate, and alicyclic or aromatic (meth)acrylate.

10. A contact lens material according to claim 9, wherein the fluorine-containing alkyl (meth)acrylate other than the fluorine-containing monomer of the formula (I) is a monomer of the formula (II),

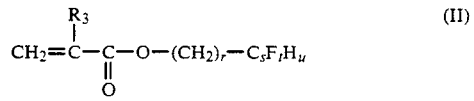
(II)

wherein $R_3$ is H or $CH_3$, r is an integer of 1 to 4, s is 1 to 10, t is an integer of 3 or greater, and u is an integer of 0 or greater.

11. A contact lens material according to claim 10, wherein, in the formula (II), s is 3 to 10 and t is an integer of 6 or greater.

12. A contact lens material according to claim 10, wherein the monomer of the formula (II) is a fluoroalkyl (meth)acrylate selected from the group consisting of hexafluoroisopropyl (meth)acrylate, hexafluorobutyl (meth)acrylate, heptafluoropropyl-methyl (meth)acrylate, nonafluorobutyl-methyl (meth)acrylate, nonafluorobutyl-ethyl (meth)acrylate, tridecafluorohexyl-methyl (meth)acrylate, tridecafluorohexyl-ethyl (meth)acrylate, heptadecafluorooctyl-methyl (meth)acrylate, heptadecafluorooctyl-ethyl (meth)acrylate, and trifluoroethyl (meth)acrylate.

13. A contact lens material according to claim 10, wherein the monomer of the formula (II) is used in such an amount that the total amount of the monomer of the formula (II) and the monomer of the formula (I) is 35 to 70 parts by weight.

14. A contact lens material according to claim 1, wherein the copolymer in a dry state has a Rockwell hardness, $H_RL$, of 60 or more.

15. A contact lens obtained by machining a contact lens material formed of a copolymer obtained by copolymerizing a monomer mixture which contains, based on 100 parts by weight of the monomer mixture, 35 to 65 parts by weight of at least one fluorine-containing monomer of the formula (I),

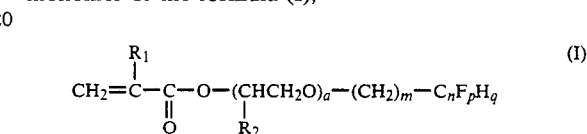
(I)

wherein $R_1$ is $CH_3$, $R_2$ is H or $CH_3$, a is an integer of 1 to 9, m is an integer of 1 to 5, n is an integer of 4 to 10, p is an integer of 8 or greater, q is an integer of 0 or greater, and p, q and n have the relationship of $p+q=2n+1$, and 35 to 45 parts by weight of at least one amide group-containing monomer as essential components and which also contains another monomer as an optional component.

16. A contact lens according to claim 15, wherein the monomer mixture contains 50 to 63 parts by weight of the fluorine-containing monomer (I).

17. A contact lens according to claim 15, wherein the fluorine-containing monomer (I) is at least one of the fluorine-containing monomers of the following formulae,

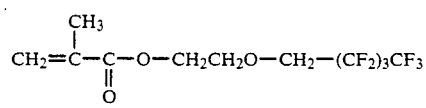

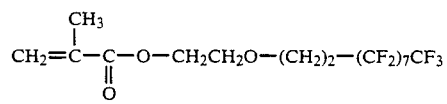

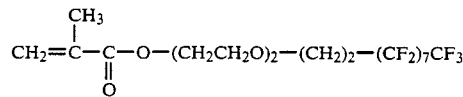

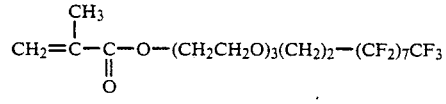

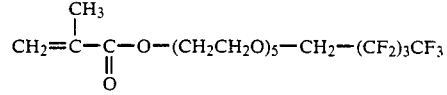

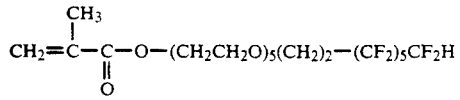

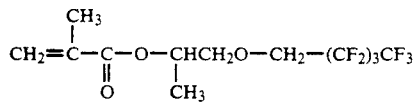

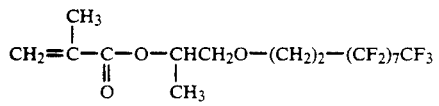

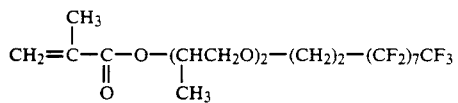

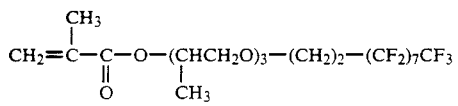

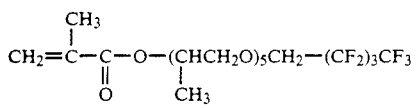

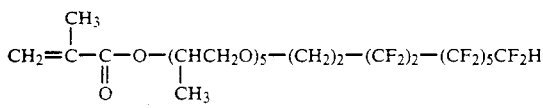

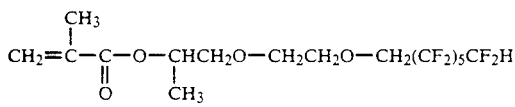

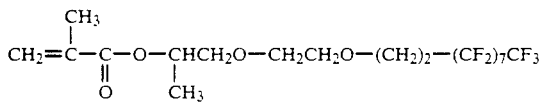

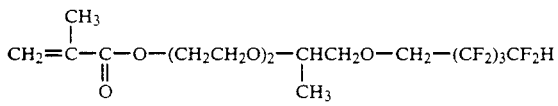

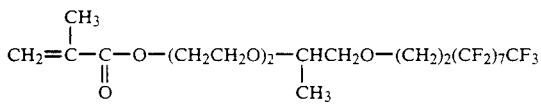

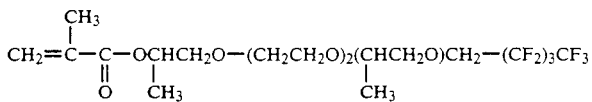

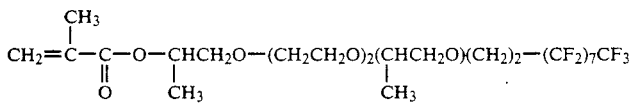

18. A contact lens according to claim 15, wherein the monomer mixture contains 35 to 43 parts by weight of the amide group-containing monomer.

19. A contact lens according to claim 15, wherein the amide group-containing monomer is N,N-dialkyl(meth)acrylamide or monoalkyl(meth)acrylamide.

20. A contact lens according to claim 15, wherein the other monomer as an optional component is a crosslinking monomer.

21. A contact lens according to claim 20, wherein the crosslinking monomer is at least one member selected from the group consisting of ethylene glycol di(meth)acrylate, diethylene glycol di(meth)acrylate, triethylene glycol di(meth)acrylate, allyl (meth)acrylate, glycerol di(meth)acrylate, trimethylolpropane tri(meth)acrylate, triallylisocyanurate, 1,4-butanediol di(meth)acrylate and divinyl benzene.

22. A contact lens according to claim 20, wherein the crosslinking monomer is used in an amount of 0.01 to 10 parts by weight based on 100 parts by weight of the total monomer mixture including the crosslinking monomer.

23. A contact lens according to claim 20, wherein the other monomer as an optional component is at least one member selected from the group consisting of alkyl (meth)acrylate, fluorine-containing alkyl (meth)acrylate other than the fluorine-containing monomer of the formula (I), silicone-containing (meth)acrylate, and alicyclic or aromatic (meth)acrylate.

24. A contact lens according to claim 23, wherein the fluorine-containing alkyl (meth)acrylate other than the fluorine-containing monomer of the formula (I) is a monomer of the formula (II), $$CH_2=C(R_3)-C(=O)-O-(CH_2)_r-C_sF_tH_u \quad (II)$$

wherein $R_3$ is H or $CH_3$, r is an integer of 1 to 4, s is 1 to 10, t is an integer of 3 or greater, and u is an integer of 0 or greater.

25. A contact lens according to claim 24, wherein, in the formula (II), s is 3 to 10 and t is an integer of 6 or greater.

26. A contact lens according to claim 24, wherein the monomer of the formula (II) is a fluoroalkyl (meth)acrylate selected from the group consisting of hexafluoroisopropyl (meth)acrylate, hexafluorobutyl (meth)acrylate, heptafluoropropyl-methyl (meth)acrylate, nonafluorobutyl-methyl (meth)acrylate, nonafluorobutyl-ethyl (meth)acrylate, tridecafluorohexyl-methyl (meth)acrylate, tridecafluorohexyl-ethyl (meth)acrylate, heptadecafluorooctyl-methyl (meth)acrylate, heptadecafluorooctyl-ethyl (meth)acrylate, and trifluoroethyl (meth)acrylate.

27. A contact lens according to claim 24, wherein the monomer of the formula (II) is used in such an amount that the total amount of the monomer of the formula (II) and the monomer of the formula (I) is 35 to 70 parts by weight.

28. A contact lens according to claim 15, which has a water content of 25 to 55% after hydration and is a hydrous contact lens.

* * * * *